$$\cos \lambda_i = \left[ \frac{M_b}{M_{TIP}} - \mu \right] \frac{R}{r_i}$$

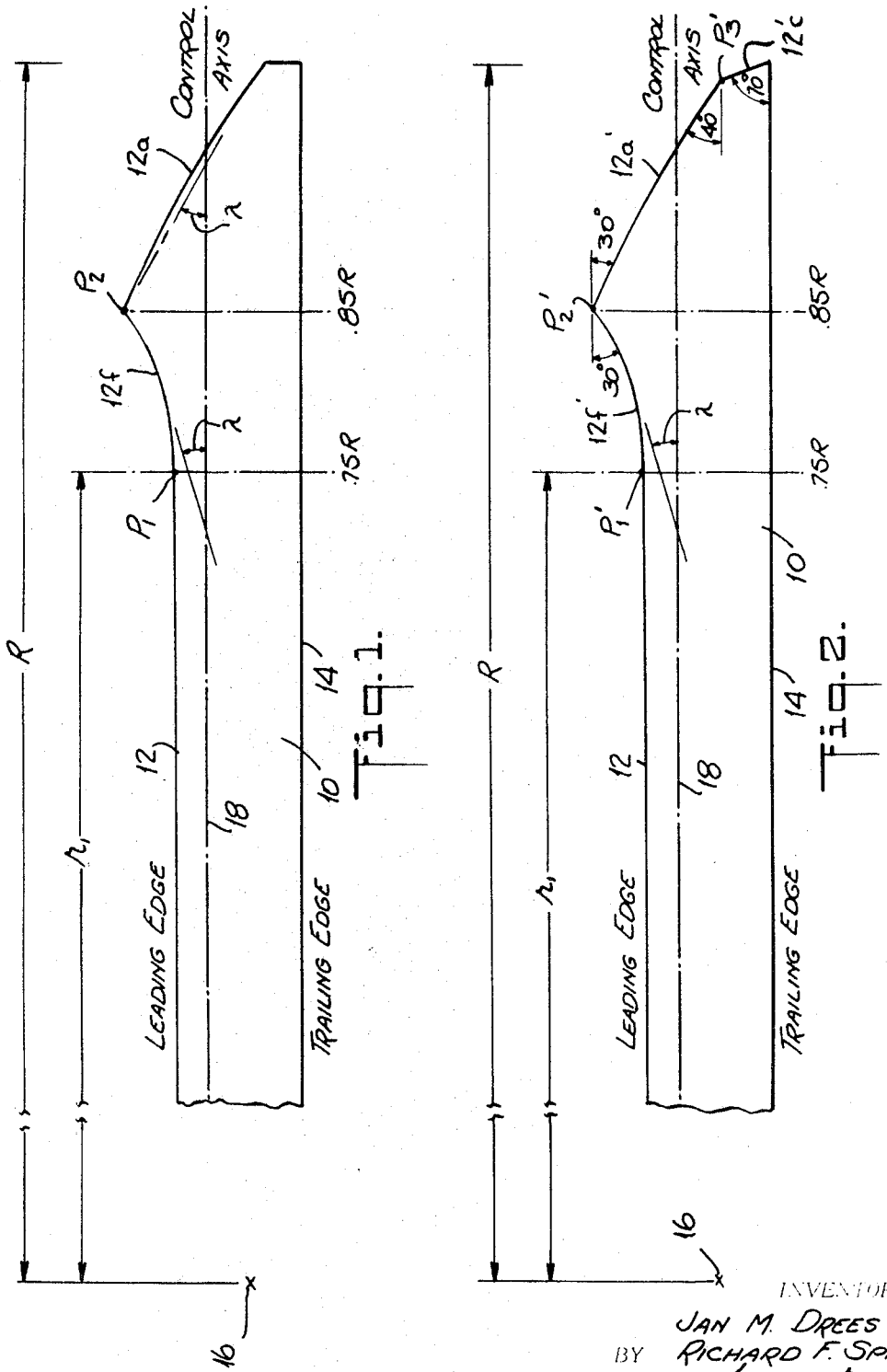

In which:

$r_i$ = Radial distance to point $i$ on the leading edge $R$ = Radius of blade to outermost tip $\lambda_i$ = Acute sweep angle at point $i$ on the leading edge of the blade $M_b$ = The design Mach number for the blade $M_{TIP}$ = Blade tip speed Mach number (at maximum rotational speed with no forward velocity)

$\mu$ = Advance ratio = $\dfrac{\text{Maximum Forward Velocity}}{\text{Maximum Rotational Tip Speed}}$

Fig. 3.

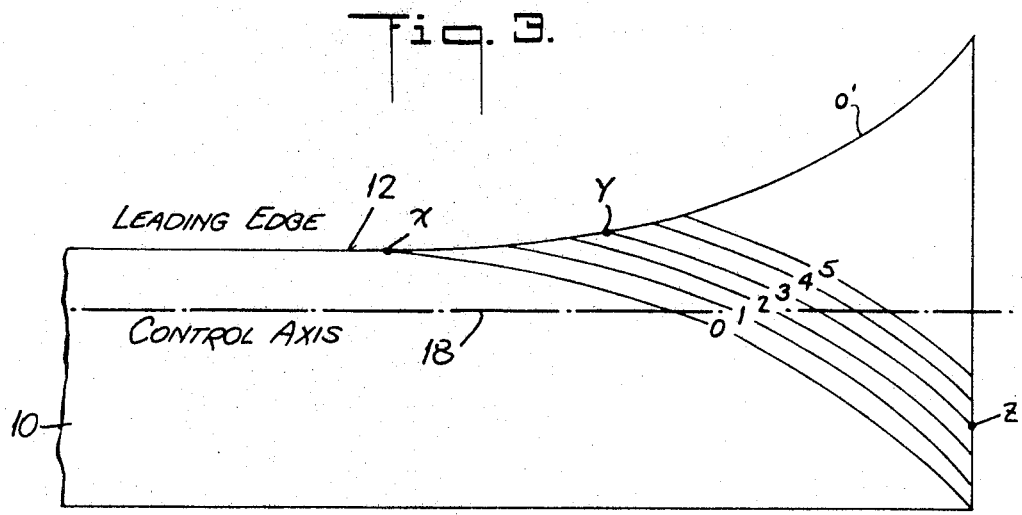

Fig. 4.

INVENTORS
JAN M. DREES
RICHARD F. SPIVEY
BY Kenyon & Kenyon
ATTORNEYS

United States Patent Office 3,467,197
Patented Sept. 16, 1969

3,467,197
ROTOR BLADE
Richard F. Spivey, Fort Worth, Tex., and Jan M. Drees, Dallas, Tex., assignors to Bell Aerospace Corporation, Wheatfield, N.Y., a corporation of Delaware
Filed May 7, 1968, Ser. No. 727,278
Int. Cl. B64c 27/46
U.S. Cl. 170—159
14 Claims

ABSTRACT OF THE DISCLOSURE

There is disclosed a rotor blade outboard portion whose leading edge has a first section with a forward sweep and a second section with a rearward sweep, the rearward sweep being outboard of the forward sweep. The relationship between the various blade design parameters to provide optimum blade leading edge sweep angles is set forth. A further tip sweep optimization provides decreased tip vortex effect.

SPECIFICATION

This invention relates in general to the design of the outboard portion of a rotor blade and more particularly to a technique for optimizing the forward and aft sweeps of the leading edge of a helicopter rotor blade so as to increase compressibility delay at high speed flight and to a further blade tip sweep optimization to minimize tip vortex.

BACKGROUND OF THE INVENTION

Because the outboard section of the helicopter rotor blade operates at a higher air speed than does the inboard section, the outboard section is subjected to considerably greater forces, provides the major portion of the lift and is the portion of the helicopter which generates the limitations of drag (or stall) and noise due to approaching the speed of sound.

"Compressibility" is the term that has been applied to the undesirable phenomenon which occurs as the airfoil approaches the speed of sound. In fixed wing aircraft, a swept wing design has been employed to provide compressibility delay, by which is meant that the undesirable effects due to approaching the speed of sound are put off until the aircraft reaches higher speeds (higher Mach numbers).

It has also been suggested in this art that a swept rotor blade tip would be desirable to achieve compressibility delay. It has even been suggested, in general terms, that a combination of forward and aft sweep could be employed. Indeed, as long ago as 1963, applicant suggested the possibility of a dual sweep leading edge for the rotor blade in an article entitled "High Speed Helicopter Rotor Design" that appeared in the Proceedings of the American Helicopter Society's Nineteenth Annual National Forum in May 1963.

However, it has not been possible to achieve the full benefits of a swept rotor blade design because there are no guidelines to follow.

Accordingly, it is a major purpose of this invention to provide guidelines for designing rotor blades having a swept leading edge.

In particular, it is an important purpose of this invention to provide such guidelines as will permit optimizing or approximately optimizing the swept leading edge design so that maximum compressibility delay will be achieved and maximum helicopter performance result.

In addition to the compressibility effect, there is a tip turbulence effect which has been called tip vortex. This tip vortex is an undesired air flow around the outboard tip of the rotor blade and results in decreased lift.

Accordingly, it is a further purpose of this invention to provide such leading edge sweep optimization as will minimize the tip vortex.

SUMMARY OF THE INVENTION

In brief, this invention involves a means for optimizing the leading edge sweep in order to provide the maximum gain in compressibility delay. The actual parameter which is optimized by means of this invention is the line of minimum pressure along the top surface of the rotor blade airfoil. In most designs the line of minimum pressure and the leading edge of the rotor blade are parallel, and thus the invention, in most applications may be considered a means for optimizing the sweep of the leading edge of the rotor blade.

The optimization involves a relationship between the sweep angle and various blade design parameters such as the radius of the blade, the design maximum Mach number for the blade, the blade tip speed Mach number and the blade advance ratio. The optimized relationship between these various parameters is shown in the equation of FIG. 3.

There is a further leading edge sweep of 70° aft at the tip of the rotor blade so as to minimize the effect of an air flow turbulence that has been called a tip vortex effect.

BRIEF DESCRIPTION OF THE DRAWINGS

Other objects and purposes of this invention will become apparent from the following detailed description and drawings, in which:

FIGURE 1 is a plan view of a helicopter rotor blade designed in accordance with the teachings of this invention, illustrating the shape of the leading edge to obtain compressibility delay;

FIGURE 2 is a view similar to FIGURE 1, illustrating the further refinement of tip sweep to reduce tip vortex;

FIGURE 3 is an equation descriptive of the leading edge sweeps, shown in FIGURES 1 and 2, obtain compressibility delay; and FIGURE 4 is a graphical representation illustrating a technique for determining the point at which the sweep angle of the leading edge is shifted from a forward sweep to an aft sweep.

DETAILED DESCRIPTION OF THE PREFERRED EMBODIMENTS

The operation of the helicopter blade of this invention and how it achieves its purposes can best be understood with some understanding of the structural arrangement shown in the figures.

With reference to FIGURE 1, the rotor blade 10 is shown in plan view with its leading edge 12 and trailing edge 14 so identified. The radius R of the rotor blade 10 is the distance from the axis 16 about which it rotates. This radius R can be considered herein as a given magnitude for a given helicopter. The radius R of the rotor blade is generally dictated by dimensions of the helicopter since it is important that the main rotor blade clear the tail rotor. For present purposes, we can assume that the rotor blade is designed to have as large a radius R as possible as long as it clears the tail rotor.

The control axis 18 is usually about ¼ of the distance between the leading edge and the trailing edge and represents the aerodynamic center of the blade 10. It is normally desirable to maintain the pitching moments about the control axis 18 at a minimum and one of the considerations in the design of the swept leading edge of its blade is to keep the pitching moments about the control axis 18 at a minimum or at some desired predetermined value.

In the FIG. 1 design, the leading edge 12 is straight and approximately radial, as in the normal square edged blade design, out to the point $P_1$. Between the point $P_1$ and $P_2$, the leading edge is swept forward to provide a leading edge segment designated as 12f. Between the point $P_2$ and the outboard end of the blade 10, the leading edge sweeps aft to provide a leading edge segment designated herein as 12a.

As shown in FIG. 1, the forward sweep portion 12f and the aft sweep portion 12a are curved lines. The angles that the swept portion of the leading edge 12 makes with a radial line (such as may be approximated by the control axis 18) is designated as lambda ($\lambda$). The angle lambda varies as a function of the radial distance r at each point along the leading edge 12 outboard from the point $P_1$. The relationship between the cosine of lambda and the radial distance r from the axis of rotation 16 to each point i along the swept portion of the leading edge 12 is described by the equation shown in FIG. 3.

The sweep angle lambda is measured, at any point i on the leading edge 12 of the blade, as the angle between the radial line $r_1$ drawn from the axis of rotation 16 through that point i and a line tangent to the point i. The dimensions of the rotor blade 10 are such that, for practical purposes, a single substantially radial line, such as the control axis 18, can be employed as the base line from which the sweep angle lambda is measured. This is because the sweep angles involved are at the outboard portion of the blade and because the chord length of the blade is relatively small compared to the length R of the blade. Thus the more strictly drawn radial line through each point $P_1$ on the leading edge 12 of the blade will be sufficiently parallel to a line such as the control axis 18 that the measurement of the sweep angle lambda to either of these two base lines will provide sufficiently accurate results.

As may be seen from FIG. 3, the cosine of the sweep angle lambda is inversely proportional to the first order of the radial distance r. It is this relationship between the sweep angle and the radius r that provides the optimization that it is the purpose of this invention to achieve.

In one particular embodiment, the point $P_1$ at which the leading edge sweep is started was at approximately 75% of the rotor blade radius R. The forward swept portion 12f of the leading edge extended to a point $P_2$ which was about 85% of the blade radius. In that particular embodiment, the point $P_2$ was selected (for reasons having to do with maintaining moment about the control axis at a minimum) such that the sweep angle lambda was 30° at point $P_2$. The sweep angle lambda of each point along the forward sweeping portion 12f of the leading edge was in accordance with the relationship described by the equation of FIG. 3. The aft sweep portion 12a of the leading edge extended for the remaining 15% of the blade 10. Although the direction of sweep of the aft swept portion 12a was inverse to that of the forward swept portion 12f, the sweep angle lambda of each point on the aft sweep portion 12a is also described by the equation in FIG. 3. But it should be understood that the sweep angle lambda of the aft swept portion 12a as well as of the forward swept portion 12f is the acute angle between the tangent to each point on the leading edge and a radial line. In effect, if the forward swept portion of the leading edge were extended past the breaking point $P^2$, it would provide a mirror image (around a line through the break point $P_2$) of the aft swept portion 12a. As shown in FIGS. 1, 2 and 4, the forward swept portion 12f has a concave shape, while the aft swept portion 12a has a convex shape.

For the purpose of compressibility delay, it does not particularly matter whether the angle involved is swept forward or swept aft. However, for the purpose of maintaining the pitching moment around the control axis 18 at a minimum (or, in certain cases at a predetermined desired value) it becomes necessary to employ a combination of forward sweep and aft sweep.

FIG. 2 differs from FIG. 1 primarily in that the outermost tip of the blade is cut off at the point $P_3'$ by a cut that is at a sweep angle of 70° to provide a final leading edge section 12c'. A major purpose of this 70° end cut for the blade is to minimize the loss of lift due to tip vortex. Experimental testing has shown that an approximately 70° leading edge sweep at the most outboard portion of the rotor blade results in minimizing the lift loss due to the tip vortex effect. Apparently, this 70° angular sweep causes the vortex to shift back to the very tip of the blade and thereby minimizes the loss of lift.

In this fashion, an additional optimization of leading edge sweep is obtained which minimizes the vortex effect.

Both vortex effect and compressibility result in loss of lift and reduction in the L/D (lift over diameter) ratio. Although the explanation of these two effects is different and the actual phenomenon involved appear to be different, the undesirable effects of both phenomena can be minimized by means of an optimized leading edge sweep design. The more important effect, compressibility, is minimized (that is delayed) by a leading edge sweep design in accordance with the FIG. 3 equation while tip vortex is minimized by a leading edge aft sweep of approximately 70°.

In FIG. 2 embodiment built and tested, the location of the points $P_1'$ and $P_2'$ were essentially as described above, at 75% and 85%, respectively, of the radial distance R from the axis of rotation 16. In addition, the point $P_3'$ was located at about 97% of the blade radius R from the axis 16 to provide a final leading edge segment 12c' having a 70° aft sweep angle. As shown in FIG. 2, the aft sweep segment 12a', which conforms to the FIG. 3 equation, proceeded from a 30° sweep angle lambda, to a 40° sweep angle at point $P_3'$.

The breaking point $P_2$ between the forward swept section 12f and aft swept section 12a is normally selected so as to provide a minimum pitching moment around the control axis 18. The buildup of blade area forward of the normal straight leading edge 12 results in excessive positive pitch moment about the control axis. Similarly, cutaway of the normal straight leading edge 12 to provide an aft sweep reduces the blade area aft of the control axis 18 more than it reduces blade area forward of the control axis 18 and thus results in excessive negative pitching moments. A combination of a forward sweep and an aft sweep is employed to balance out these two effects. As indicates, in one blade design, the breaking point $P_2$ between the forward sweep portion 12f and the aft sweep portion 12a was selected where the sweep angle equaled 30° because that provided the desired balance between positive and negative pitching moments.

Of course, it should be understood that advantage may be taken of this particular type of leading edge design to create a predetermined desired pitching moment. The design would then proceed on the basis of minimizing the deviation from the predetermined pitching moment.

FIG. 4 illustrates a technique for determining the breaking point $P_2$ which will avoid excessive negative or positive pitching moments. Ignore for present purposes the superimposed sweep angle of 70° as shown in FIG. 2. Line O represents the FIG. 3 equation of sweep angles desired for the rotor blade under consideration if all sweep was aft sweep. Then line O' would represent equivalent forward sweep and would be a mirror image around the leading edge 12 of the line O. Of course, whereas a blade tip constructed with the aft sweep line O would have excessive negative pitching moments, a blade tip constructed with forward sweep line O' would have excessive positive pitching moments.

It is desired to find the combination of the two sweeps that will result in a blade tip section without excessive negative or positive pitching moments. This can be accomplished by assuming various aft sweep lines, as lines 1, 2, 3, 4 and 5 for example, all of which include the proper radial angular distribution and each of which intersects the basic forward sweep line O' at a different point. For each of the various combinations of forward and aft sweep established (such as the line formed by x, y and z)

the aerodynamic moments around the control axis 18 can be calculated and the combination of forward and aft sweep provided the desired moment, or lack of moment, can be selected.

In addition to the elimination of pitching moments, the multiple sweep extends the compressibility delay and (as contrasted with solely aft sweep) increases the blade tip area. This last point, concerning the increase in blade tip area, relates to an important reasons why aft sweep alone is undesirable. The maximum lift provided by a helicopter blade is near its tip because the tip of the blade has the greatest speed. To cut off a major portion of the outboard tip would therefore seriously deteriorate the $L/D$ ratio. By including a forward sweep portion $12f$ in conjunction with the aft sweep portion $12a$, the loss of $L/D$ is minimized. Indeed, the actual $L/D$ available is increased because the resultant compressibility delay permits greater blade rotational speeds and thus increased lift.

FIG. 3 illustrates the approximate equation for optimum rotor blade leading edge sweep. There is one important qualification to the meaning of FIG. 3 which should be kept in mind and to understand this qualification the concept o fa line of minimum pressure has to be introduced. In operation, the pressure profile along each chord of the rotor blade will have variations. There will be one point along each chord where the pressure is at a minimum. A line connecting these points of minimum pressure will be called herein "the line of minimum pressure." In normal rotor blade design, this line of minimum pressure is generally a straight line closely parallel to the leading edge.

As a general rule, in rotor design, the line of minimum pressure will be parallel to the leading edge of the rotor blade. In high speed forward flight, the flight condition under which the maximum Mach number for which the blade is designed is most likely to be reached, a low angle of attack is typical. Under such conditions, the line of minimum pressure is very close to the line of maximum thickness of the airfoil. At higher angles of attack, the line of minimal pressure tends to move toward the leading edge. In either case, the leading edge, the lines of minimum pressure and the line of maximum thickness all tend to be parallel lines. It would be possible to modify the line of minimum pressure by an aft sweep of the line of maximum thickness. There are many practical reasons why there would be a real limitation on the magnitude of any such aft sweep and thus practical limits on the extent to which the line of minimum pressure might deviate from a line parallel to the control axis. However, because such variations in the design of the rotor blade could result in non-parallelism between the line of minimum pressure and the normally straight leading edge, an important qualification of the FIG. 3 equation should be kept in mind.

The above description and discussion of the FIG. 3 equation has presumed that the sweep angle lambda is the acute angle between the tangent to a point on the leading edge 12 of the rotor blade and a radial line to that point. But the significant contour from the point of view of compressibility is the line of minimum air pressure intersecting each chord of the rotor blade 10. Thus it is more accurate to state that the equation of FIG. 3 is an equation of the sweep angle of the line of minimum pressure.

Where the rotor blade design is such that, for example, the line of maximum thickness is given a slight aft sweep, then the actual leading edge of the rotor blade might deviate somewhat from that described by the equation of FIGURE 3. Optimum design, in such a case, calls for the line of minimum pressure to be in conformance with the equation of FIG. 3. However, the initial design of the rotor blade with a leading edge in conformance with the FIG. 3 equation would result in a good approximation of the final fully optimized design. In such cases, the initially designed rotor blade would be tested in a wind tunnel in order to determine the actual line of minimum pressure and then the contour of the rotor blade modified in whatever fashion is necessary to cause this line of minimum pressure to conform with the FIG. 3 equation.

The design maximum Mach number $M_b$ for the blade is selected as a function of the maximum forward speed at which the aircraft is designed to operate and the maximum rotational speed of the rotor blade under such conditions. The selection of this number $M_b$ is a known technique in the art. As far as the FIG. 3 equation is concerned, the design maximum Mach number is designed to be as small as possible so that point $P_1$, at which the sweep angle lambda starts to become effective, is moved inboard as much as possible. The reason for this is that the point at which the limiting effect of compressibility will first be felt. Roughly speaking, points outboard of $P_1$ will be designed in accordance with the FIG. 3 equation and thus will have a compressibility delay to overcome the fact that they are moving at higher speeds due to their more outboard position in the rotor blade. Points inboard of $P_1$ will, of course, be moving at lower speeds than point $P_1$ and thus will not produce the compressibility effect as soon as will the point $P_1$. Thus the further inboard $P_1$ can be made, the more effective will be a design in accordance with this invention.

One of the important aspects of using a dual sweep is that it makes it possible to bring the point $P_1$ inboard further than if only a single aft sweep design were employed. The build up of forward sweep before starting the aft sweep makes it possible for the aft sweep to be extended further than would otherwise be the case. Accordingly, a dual sweep design not only provides moment balance but permits more effective sweep design because it brings the point $P_1$ at which the sweep starts further inboard than otherwise would be the case.

As discussed above, the effectiveness of the optimization which the FIG. 3 equation provides is a distinct function of how far inboard the equation can be applied. When narrow chord rotor blades are employed, some compromise with the FIG. 3 equation will have to be employed. In a rotor blade, that might have a radius R of 50 feet and a chord length of 20 inches, a strict following of the FIG. 3 equation would result in building up a great deal of forward sweep followed by an aft sweep that cuts into the rotor blade aft of the control axis by so little that the pitching moment is seriously unbalanced. Under such conditions, the FIG. 3 equation provides a first approximation as to the shape and location of the leading edge sweep angle. In such cases, it might be necessary to start further outboard than would otherwise be desirable and to start the sweep at an initial angle greater than the 0° which would be employed if it were possible to start further inboard. Thus in some cases, it is only a portion of the shape described by FIG. 3 that would be employed.

From the above comments concerning those circumstances where the FIG. 3 equation may have to be approximated or compromised, it can be seen that in most cases the FIG. 3 equation for the sweep angle of the leading edge (or, to be more precise, line of minimum pressure) provides a close approximation to optimum design. In all cases, the FIG. 3 equation provides an initial design from which only relatively minor empirically dictated deviations may be made to provide final optimization.

In this fashion, a design is provided which achieves the objects of this invention and in connection with a test on one rotor blade so designed resulted in a pronounced performance improvement. One result of the performance improvement was a dramatic reduction in noise.

The above description is in terms of the main rotor blade but the inventive concept may be applied to the tail rotor blades as well and to other rotating airfoils.

What is claimed is:

1. In a rotatable airfoil having a leading edge with an inboard portion and an outboard swept portion, the outboard swept portion having a forward swept portion and an aft swept portion, the improvement comprising:
(a) the leading edge of said forward swept portion having a concave shape,
(b) the leading edge of said aft swept portion having a convex shape, and
(c) the cosine of the acute sweep angle at each point along said forward and said aft swept portions of said leading edge being inversely proportional to substantially the first order of the radial distance to each of said points along said leading edge.

2. The improvement of claim 1 further comprising:
an outboard second aft swept leading edge portion having a sweep angle substantially greater than that called for by the relationship of claim 1.

3. The improvement of claim 2 wherein said sweep angle of said second aft sweep leading edge portion is substantially 70°.

4. The improvement of claim 1 wherein the relationship between said sweep angle and said radial distance is substantially as set forth in the equation:

$$\cos \lambda_i = \left[ \frac{M_b}{M_{TIP}} - \mu \right] \frac{R}{r_i}$$

in which:
$r_i$ = radial distance to point $i$ on the leading edge
$R$ = radius of blade to outermost tip
$\lambda_i$ = acute sweep angle at point $i$ on the leading edge of the blade
$M_b$ = the design Mach number for the blade
$M_{TIP}$ = blade tip speed Mach number (at maximum rotational speed with no forward velocity)

$$\mu = \text{advance ratio} = \frac{\text{Maximum forward velocity}}{\text{Maximum rotational tip speed}}$$

5. The improvement of claim 4 further comprising:
an additional outboard section aft swept leading edge portion leading to the blade tip and having a sweep angle substantially greater than that called for by said equation.

6. The improvement of claim 5 wherein said sweep angle of said second aft sweep leading edge portion is substantially 70°.

7. The improvement of claim 4 wherein:
(a) said forward swept portion extends from a first point at which said sweep angle is zero outboard to a second point at which said sweep angle is aproximately 30°, and
(b) said aft swept portion extends from said second point at which said aft swept portion has a sweep angle of approximately 30° outboard to a third point at which said sweep is approximately 40°.

8. The improvement of claim 7 further characterized by:
a straight line aft swept portion of said leading edge, said straight line portion extending from said third point outboard to the outermost tip of said airfoil, said third portion having a sweep angle of approximately 70°.

9. The improvement of claim 8 wherein:
(a) said first point is along a chord located approximately 75% of hte airfoil radius from the axis of rotation,
(b) said second point is along a chord located approximately 85% of the airfoil radius from the axis of rotation, and
(c) said third point is along a chord located approximately 97% of the airfoil radius from the axis of rotation.

10. In a rotatable airfoil having a line of minimum pressure formed by connecting the points of minimum air pressure on each blade chord, with an inboard portion and an outboard swept portion along said line of minimum pressure, the outboard swept portion having a forward swept portion and an after swept portion, the improvement comprising:
(a) the forward swept portion having a concave shape,
(b) the aft swept portion having a convex shape, and
(c) the cosine of the acute sweep angle at each point along the swept portions of said line of minimum pressure being inversely proportional to substantially the first order of the radial distance to each of said points along said line of minimum pressure.

11. The improvement of claim 10 further comprising:
an additional outboard aft swept portion of the leading edge of said airfoil, the acute sweep angle of said aft swept portion of said leading edge being substantially 70°.

12. The improvement of claim 10 wherein the relationship between said sweep angle and said radial distance is substantially as set forth in the equation:

$$\cos \lambda_i = \left[ \frac{M_b}{M_{TIP}} - \mu \right] \frac{R}{r_i}$$

in which:
$r_i$ = radial distance to point $i$ on the line of minimum pressure
$R$ = radius of blade to outermost tip
$\lambda_i$ = acute sweep angle at point $i$ on the line of minimum pressure
$M_b$ = The design Mach number for the blade
$M_{TIP}$ = blade tip speed Mach number (at maximum rotational speed with no forward velocity)

$$\mu = \text{advance ratio} = \frac{\text{Maximum forward velocity}}{\text{Maximum rotational tip speed}}$$

13. The improvement of claim 12 further comprising:
an additional outboard aft swept leading edge portion of said airfoil having a sweep angle substantially greater than that called for by said equation.

14. The improvement of claim 13 wherein said sweep angle of said aft swept portion of said leading edge is substantially 70°.

References Cited
UNITED STATES PATENTS

| | | | |
|---|---|---|---|
| 1,692,081 | 11/1928 | Cierva | 170—159 |
| 1,888,056 | 11/1932 | Verzillo et al. | 170—159 |
| 2,070,657 | 2/1937 | Hafner. | |
| 2,152,861 | 4/1939 | Bennett. | |
| 2,422,388 | 6/1947 | Billings | 170—159 X |
| 3,053,325 | 9/1962 | Ferreira | 170—159 |
| 3,066,742 | 12/1962 | Castles. | |

EVERETTE A. POWELL, Jr., Primary Examiner